June 24, 1941. W. K. SIMPSON 2,246,765
RADIATOR VENT VALVE
Filed Aug. 22, 1940
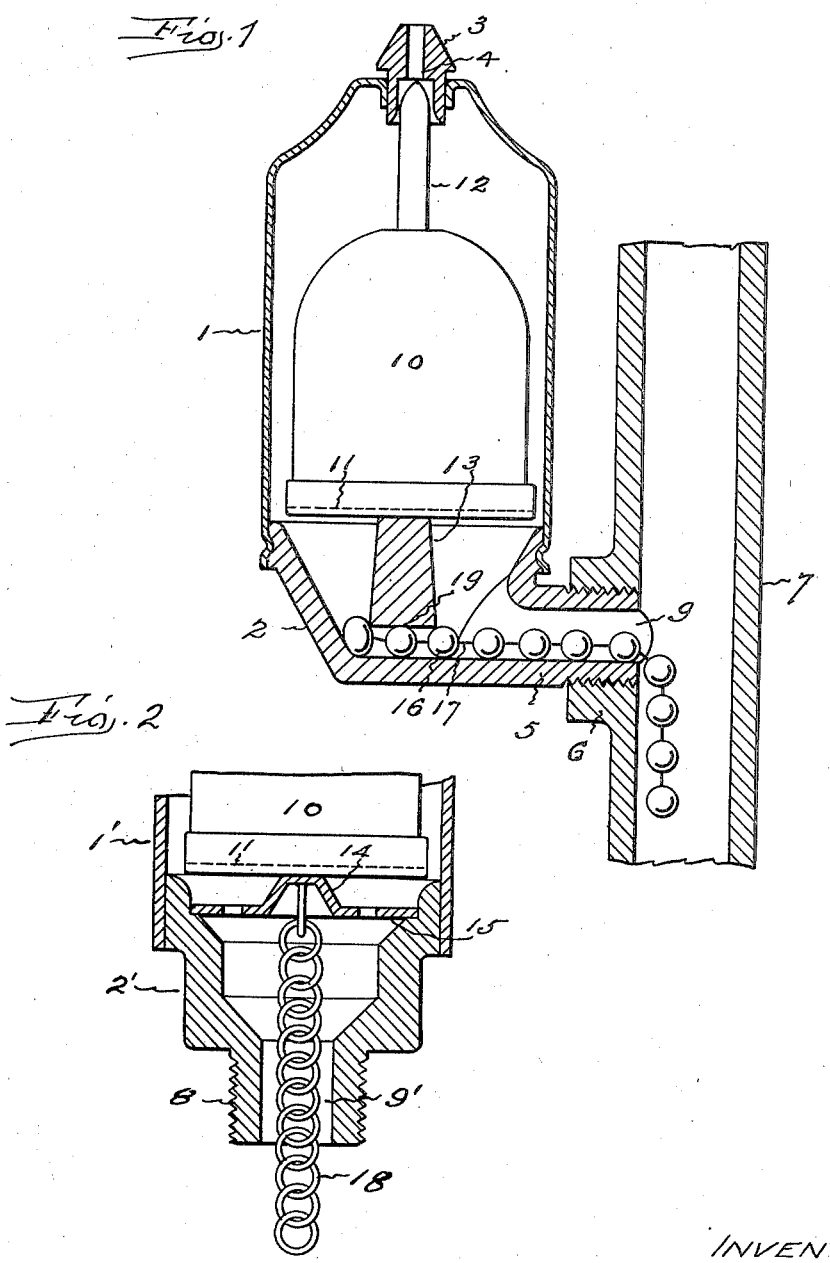
INVENTOR
William K. Simpson
By Harry R. Williams
Atty.

Patented June 24, 1941

2,246,765

UNITED STATES PATENT OFFICE 2,246,765

RADIATOR VENT VALVE

William K. Simpson, Waterbury, Conn., assignor to The M. S. Little Manufacturing Company, Hartford, Conn., a corporation of Connecticut Application August 22, 1940, Serial No. 353,666

7 Claims. (Cl. 137—122)

The invention relates to those valves which are designed for use in steam systems to permit the escape of air, but prevent the outflow of steam or water from radiators or other parts of systems where venting is desirable.

The object of the invention is to provide a valve of the type mentioned with simple, inexpensive, positive acting drainage means that will be durable, not subject to damage and will be adaptable to all commonly used radiators without possibility of misplacement or disarrangement, which means will offer resistance to quick inflow of water caused by surges in the radiator and the drainage thereof, as well as the efficient removal of normal condensate which results when the valve contains steam.

This object is attained by arranging in conjunction with the usual thermostatic float valve which closes the air escape vent when subjected to the temperature of steam or when lifted by the inflow of water, a flexible drainage member that will lead from the interior of the valve to the radiator or other space to be vented when the valve is in place of use, which member requires no special relative proportions, manipulation or adjustment to meet the conditions encountered in the particular system with which the valve is to be used.

In the accompanying drawing:

Fig. 1 shows on enlarged scale a vertical section of an automatic radiator air valve which embodies the invention attached to a fragment of a radiator, with one type of flexible drainage member.

Fig. 2 shows a similar section of the lower end of a valve of modified form with a different type of flexible drainage member.

The valve has a casing comprised of a shell 1 and a base 2. The shell at its upper end has a plug 3 with an air vent 4. The base may have an angularly extended nipple 5 adapted to be threaded into a boss 6 on the side of a radiator 7 that is to be vented, as shown in Fig. 1, or the base may have a downwardly extended nipple 8, as seen in Fig. 2, adapted to be threaded into the top of a radiator or into a pipe end. The bores 9 and 9' of these nipples permit the passage of air, water and steam from the radiator into the valve.

Inside of the casing is a combined float and thermostatic member 10 that contains a volatile fluid which will respond to temperature changes and cause expansion or allow contraction of a flexible diaphragm 11 which forms the bottom of the float member. Expansion of the diaphragm lifts the float member and causes the valve pin 12 attached to the top of the float to close the air vent, while the contraction of the diaphragm allows the float to lower and the pin to open the vent. The valve pin will also close the air vent when the float is lifted by water in the valve. The float may be supported by a solid post 13 which extends upward from the bottom of the base, as seen in Fig. 1, or may be supported by a hollow post 14 extending upward from a perforated disk 15 placed in the base, as seen in Fig. 2. These elements and their cooperation are common and well known.

The drainage member is preferably in the form of a chain of beads 16 loosely swivelled to connecting links 17, as shown in Fig. 1, but it may be a chain of any commercial type having loosely interconnected links 18 such as seen in Fig. 2. For attaching a bead chain the post 13 may be transversely bored, either parallel with the axis of the nipple 5, as shown in full lines 19, or oblique to the axis of the nipple, and the end bead may be enlarged or deformed to prevent the chain that is passed through the hole from being withdrawn in one direction. Other means for fastening the end of the chain may be employed, for example, its end can be secured to the disk 15 as shown in Fig. 2. The chain or flexible drainage member is of such length that it will extend from the interior of the valve through the nipple and hang down in the radiator when the valve is in position of use.

The flexible drainage member described is simple, inexpensive and not liable to get out of repair, it always hangs down in the radiator when the valve is rotated and turned into place, and it cannot be inserted and left positioned so that it will not perform its desired function. The drainage member described herein requires no accurate proportioning or adjustment to make it adaptable to each size and type of radiator.

With a valve that allows a rapid inrush of water there is a liability of the escape of water before the float can rise and close the vent, and with a valve that drains quickly the surges are more frequent than with a valve that drains slowly, therefore it is desirable that the inflow and outflow of water be retarded. With a chain drainage member resistance to inflow and outflow is caused by the breaking up of the entering and outflowing stream by the links of the chain. This is more pronounced with the bead type of chain as the difference in the cross sectional areas of the beads and their connecting links is relatively large, and also if the beads are hollow, the preferred form, the air confined in the beads will tend to float them and cause them to obstruct the free flow of water through the nipple into the valve. With normal condensation in the valve the beads or links tend to gather the condensate in drops which trickle down the chain and drop off into the radiator.

The invention claimed is:

1. A venting valve comprising a casing having ported means for attachment to the chamber to be vented and having a vent, a float within the casing, means carried by the float for opening and closing the vent, and a metallic flexible drainage member composed of a plurality of articulated links leading from the interior of the casing through said ported means and adapted to be dropped below the float chamber into the chamber to be vented.

2. A venting valve comprising a casing having ported means for attachment to the chamber to be vented and having a vent, a float within the casing, means carried by the float for opening and closing the vent, and a flexible metallic chain leading from the interior of the casing through said ported means and adapted to be dropped into the chamber to be vented.

3. A venting valve comprising a casing having ported means for attachment to the chamber to be vented and having a vent, a float within the casing, means carried by the float for opening and closing the vent, and a flexible metallic member composed of circular interconnected links leading outward from the interior of the casing through said ported means and adapted to be dropped into the chamber to be vented.

4. A venting valve comprising a casing having ported means for attachment to the chamber to be vented and having a vent, a float within the casing, means carried by the float for opening and closing the vent, and a flexible drainage member composed of metallic beads and links leading from the interior of the casing through said ported means and adapted to be dropped into the chamber to be vented.

5. A venting valve comprising a casing having ported means for attachment to the chamber to be vented and having a vent, a float within the casing, means carried by the float for opening and closing the vent, and a flexible metallic member composed of hollow beads and loosely connected links leading from the interior of the casing through said ported means and adapted to be dropped into the chamber to be vented.

6. A venting valve comprising a casing having tubular means for attachment to the chamber to be vented and having an air vent, a float with means for closing said vent in the casing, and a flexible metallic chain having an end attached within the casing and leading through said tubular attaching means to a point exteriorly thereof.

7. A venting valve comprising a casing having means for attachment to the chamber to be vented and having a vent, a float within the casing, means carried by the float for opening and closing the vent, and a metallic flexible member composed of a plurality of articulated links co-operating with said casing means for draining water from said casing.

WILLIAM K. SIMPSON.